United States Patent
Bartz et al.

(10) Patent No.: US 7,246,276 B2
(45) Date of Patent: Jul. 17, 2007

(54) ERROR TOLERANT MODULAR TESTING OF SERVICES

(75) Inventors: Thomas G. Bartz, Loveland, CO (US); Abhay Sathe, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 409 days.

(21) Appl. No.: 10/958,049

(22) Filed: Oct. 4, 2004

(65) Prior Publication Data

US 2006/0085723 A1 Apr. 20, 2006

(51) Int. Cl.
*G01R 31/28* (2006.01)
*G06F 11/00* (2006.01)

(52) U.S. Cl. .................. 714/712; 714/704; 714/746
(58) Field of Classification Search ............... None
See application file for complete search history.

(56) References Cited

U.S. PATENT DOCUMENTS

| | | | |
|---|---|---|---|
| 5,170,464 A | 12/1992 | Hayes et al. | |
| 5,838,899 A * | 11/1998 | Leavitt et al. | ............... 714/56 |
| 5,864,657 A | 1/1999 | Stiffler | |
| 6,247,118 B1 | 6/2001 | Zumkehr et al. | |
| 6,317,788 B1 | 11/2001 | Richardson | |
| 6,453,440 B1 * | 9/2002 | Cypher | ............... 714/758 |
| 6,587,973 B1 * | 7/2003 | Tanaka | ............... 714/54 |
| 6,701,342 B1 | 3/2004 | Bartz et al. | |
| 6,775,542 B1 | 8/2004 | Vilander et al. | |
| 2003/0236826 A1 | 12/2003 | Islam et al. | |
| 2005/0154550 A1 * | 7/2005 | Singh et al. | ............... 702/108 |

FOREIGN PATENT DOCUMENTS

EP 0 449 402 A3 1/1991

* cited by examiner

*Primary Examiner*—Phung My Chung

(57) ABSTRACT

Methods of error-tolerant modular testing of services are described, wherein an ordered list of test module identifiers is built in an error stack for the purposes of structured state teardown following the occurrence of an error during testing of services (i.e., network or other.) The error that triggers the teardown may comprise any error or more particularly an error not among a predetermined list of acceptable errors, the occurrence of which should not cause the cessation of services testing. Upon the occurrence of a triggering error, the test modules associated with the test module identifiers are executed in a reverse order to that which the test module identifiers were added to the error stack, effecting a structured state teardown.

20 Claims, 8 Drawing Sheets

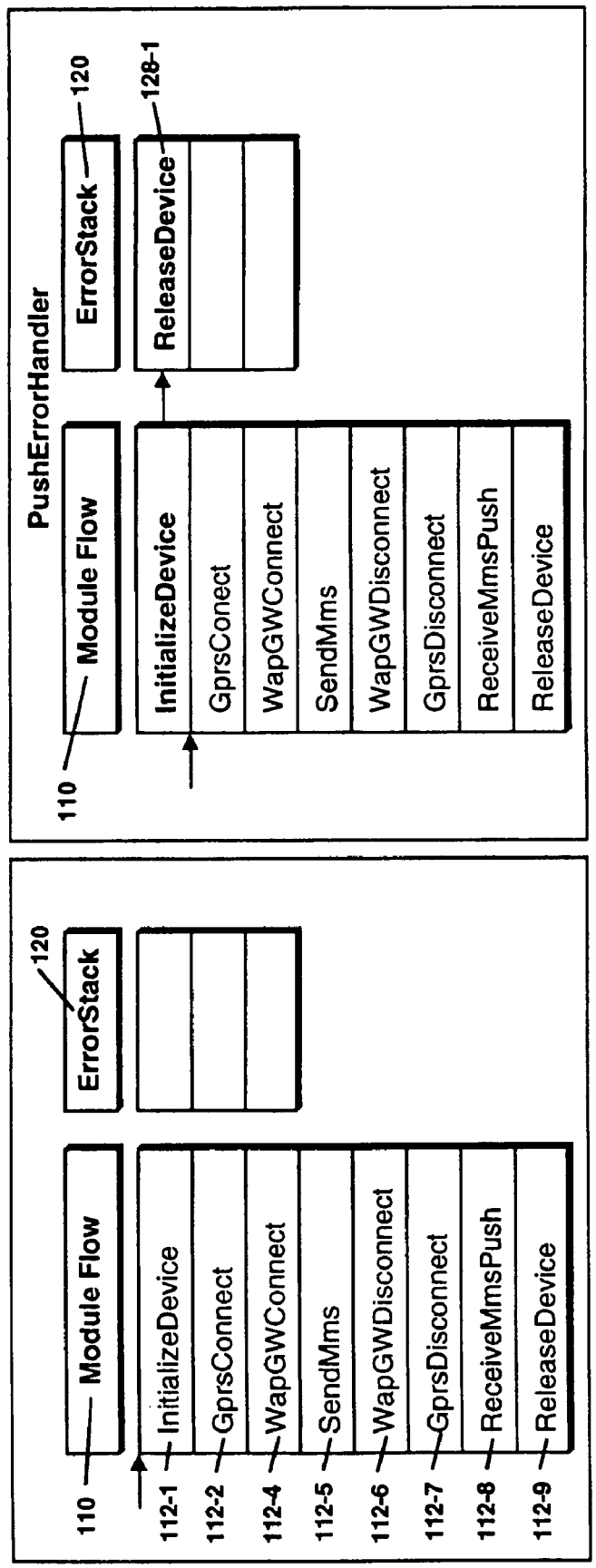

ERROR TOLERANT MODULAR TESTING OF SERVICES

BACKGROUND OF THE INVENTION

The integration of Internet services and mobile communications has been an important evolutionary step in the history of communications services. As the demand for mobile network services (including voice and packet-based IP data) increases, so does the need to characterize (by throughput, delay, delay variation, service availability, packet loss rates, reliability and priority measurements) the Quality of Service (QoS) provided by 2G, 2.5G, and 3G network services. Such networks utilize a wide variety of heterogeneous protocols (e.g., WAP, GSM, UMTS, hypertext transfer protocol/HTTP, short messaging service/SMS, General Packet Radio Services/GPRS, etc.) to provide connectivity between an end user and the services desired.

FIG. 1 illustrates the physical layout of a system framework that may be used to test the QoS of a service provided on a network 100. Operators at a service operations center (SOC) or network operations center (NOC) 102 in communication with a wireless QoS manager 104 such as, for example, the Agilent Technologies™ Wireless QoS Manager create structured network QoS tests. QoS is often characterized with active testing, wherein one or more test probes 106 simulate user operation of a device attempting to interact with the service (shown as provided by servers 101 through a gateway 103) and take measurements while doing so. The active test probes are controlled by an Active Test Controller (ATC) 108 in communication with the manager 104.

FIG. 2 reflects a graphical representation of a QoS model that describes monitored services and shows how they are organized. As suggested by the hierarchical arrangement, the test code to perform the QoS testing required to characterize network service(s) must often be executed in a structured sequence 110 of test modules 112 because interaction with the network service requires establishing particular "states" such as, for example, initializing a device, establishing a connection, or logging into a server.

Errors that occur while a client device (simulated by a test probe 106) is in a particular state can result in a number of undesirable events. For example, if a client fails to 'log out' from a session account before ending its test, the next test may be denied access to that same account. Several different approaches to handling the occurrence of errors during execution of network services testing have been undertaken. Some simply abort a test that experiences an error, leaving the service (or servers) in an unknown state that can introduce errors for subsequent tests utilizing the service. Some methods execute tests utilizing a "test step" approach, but leave error handling to the individual tests steps, which may succeed in certain circumstances, but once a state has been established by a test step, a subsequent test step has no clear and simple mechanism to call back into the prior state-creating step to reset the state. More complex error handling routines have also been written and customized, but require knowledge of the precise test sequence to be executed in order to be able to restore the state from whatever point during the test that the error occurs.

Network management often involves monitoring distinct network sub-systems (e.g., GPRS) by network operators through the use of API's. If a breakdown in the network occurs, many conventional ATCs 108 will fail all the tests scheduled for execution after the test in which the error occurred, as the ATC will follow the prescribed test sequence undeterred by the error. Thus, a multitude of error messages may be sent to monitors of various aspects of the network that might actually be operating correctly. Even potentially transient error messages can have negative effects on network QoS monitoring, confusing the error identification process and possibly resulting in the powering off of properly functioning network elements.

Whatever the benefits of the error handling approaches and testing systems discussed above, recovery from errors encountered during network testing remains disruptive, and since such systems do not leverage existing test operation modules in an automated manner, they can be costly in terms of the resources required to more precisely identify sources of the errors encountered.

SUMMARY OF THE INVENTION

The present invention provides a method of executing a structured sequence of tear down operations automatically compiled while executing a corresponding sequence of state-changing test steps. The method is applicable to any sequence of testing steps that involve building up and tearing down states such as, for example, communications links between client devices and servers. The present invention provides a method for automatically managing such states in the test sequence so the proper 'teardown' can be accomplished in the event of an error. The method automatically creates the correct teardown sequence as the test sequence advances, so that appropriate error recovery can be accomplished regardless of when an error occurs. Furthermore, the tear down mechanism is implicitly incorporated into the test modules comprising the test sequence. As such, a test developer need not concern himself with error handling, which is implicitly handled by the test sequencing and the execution environment, i.e., the invention works automatically for new test case sequences created by the test developer utilizing reusable test modules in test creation.

The ordered teardown ensures proper resetting of the state and release of all resources to the state prior to the occurrence of an otherwise unrecoverable system error through a sequence of incremental multiple actions, obviating the need to execute an overall test restart. The present invention allows each test module to inherently define the correct error action that should be taken to reverse the state change effected by the test module.

The present invention allows consistency checks on the test sequence to ensure that the error handler modules are present and are placed in correct order, reducing user error while constructing test sequences of modules.

The present invention provides a data construct hereinafter referred to as an error stack which is automatically populated with test module identifiers each corresponding to one of a sequence of executed state-changing test modules operating upon a device interacting with the service under test (SUT.) The test modules may specify errors that may be encountered, the occurrence of which should not halt execution of the sequence of tests. If an error is encountered by the device that is not among these listed "acceptable" errors, execution of the test sequence is halted and the structured teardown process commences. The teardown process pops from the error stack in a last-in first-out (LIFO) order the names of test modules to be run in order to controllable reverse the built up state.

In preferred embodiments described below, the inventive method and software control process are employed in testing the QoS of one or more services provided by a wireless communications network, providing error tolerance and more precise error identification and reducing or eliminating extraneous error messages sent to monitors of network services.

BRIEF DESCRIPTION OF THE FIGURES

For a better understanding of the present invention, together with other and further aspects thereof, reference is made to the accompanying drawings and detailed description, wherein:

FIGS. 5A–5G are illustrations of an exemplary test module sequence execution and push and pop operations upon an Error Stack associated with state changes effected by the test module executions.

DETAILED DESCRIPTION OF PREFERRED EMBODIMENTS OF THE INVENTION

Figure 1:
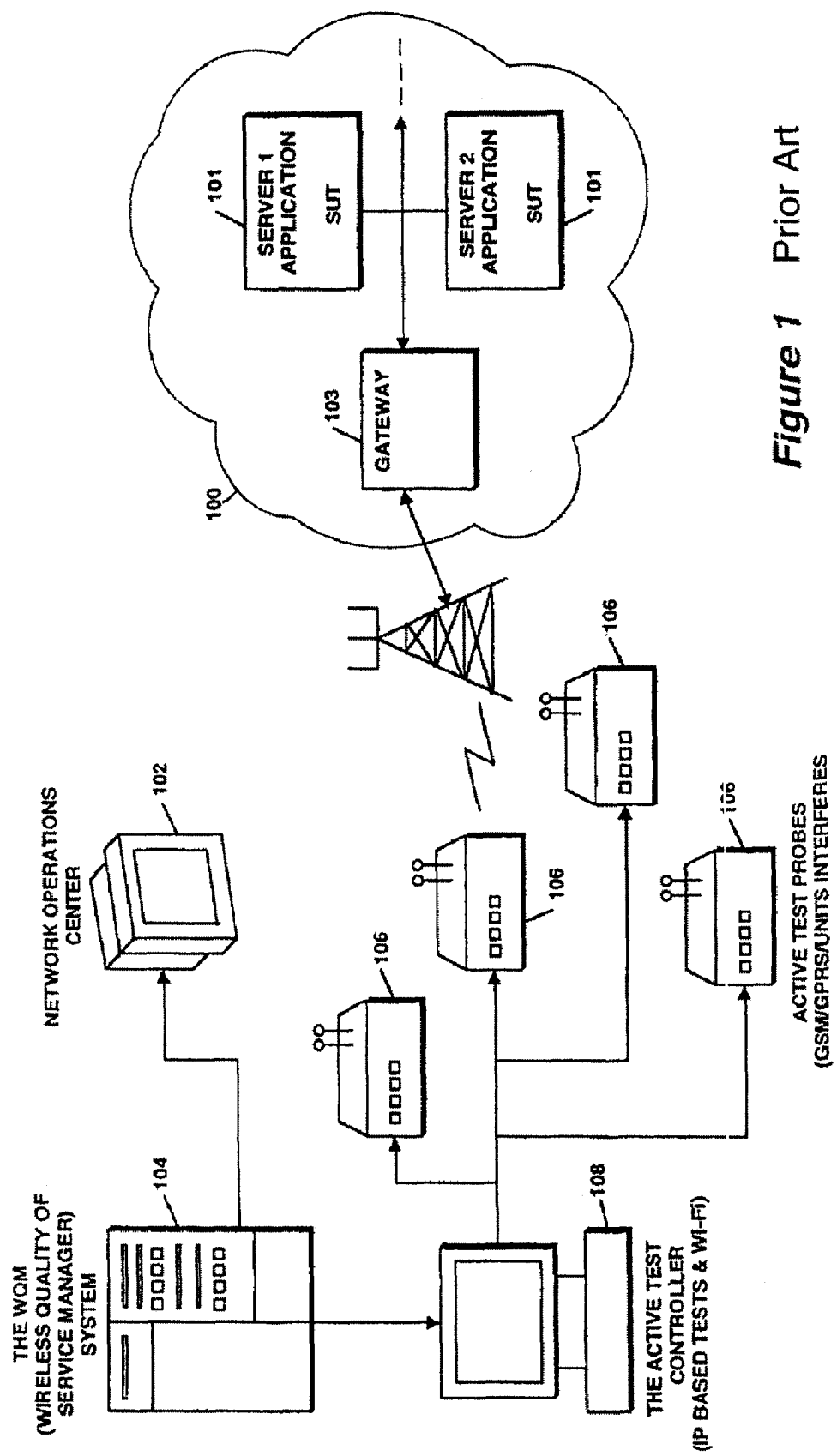
FIG. 1 is an illustration of a network service QoS testing system in which an embodiment of the present invention may be utilized.

Reference will now be made in detail to the present preferred embodiments of the present invention, examples of which are illustrated in the accompanying drawings, wherein like reference numerals refer to like elements throughout.

The present invention provides a method of and apparatus for error-tolerant modular testing of services. As used herein, the term "services" means applications provided by one or more communications or content-providing computers accessible through a network. The term "state" is defined here mean a condition of the testing probe or the service under test that is achieved after a state-forming or state-changing test 'module' is run resulting, for example, in changing the device from a powered-off to a powered-on state, going from a disconnected to a connected state, initializing the device, logging into a server, and/or other stateful requests. As used herein, the term "module" means a series of computer-executable instructions operation to achieve a specific purpose, the term "stack" means an array or other data construct capable of storing and dynamically maintaining a sequence of data. The description of preferred wireless network QoS testing embodiments below is by no means meant to be limiting, as the concept of structured teardown of states/connections upon the occurrence of a non-recoverable error may be applied to a wide variety of operating environments, including wireline and data processing networks that utilize multiple heterogeneous protocols (e.g., PSTN or ISDN, WiFi network access, CDMA or GSM Internet access, etc.) and/or other connection oriented applications.

Architecture of Operating Environment

With reference again to FIG. 1, one environment in which the present invention may be utilized is in testing services provided by a network 100. The network may be any type of network, but will be described herein as a wireless network employing GPRS and WAP protocols. One or more test probes 106 are employed to simulate end users attempting to access and/or interact with a service provided by network 100, and by doing so acquire information about the relative success of the testing and network service performance metrics (such as timing delays, etc.) This information may be recorded and/or transmitted to one or more SOC or NOC 102 operators monitoring the network QoS testing for display, and/or used to trigger some form of corrective action to address network overload conditions or network equipment malfunctions.

The operators of such a test system may develop an ordered test sequence 110 (referred to as "Wireless Test Chain" in FIG. 2) of tests modules 112 by interactions with a graphical user interface of a diagnostic management system (DMS) 104, such as the Wireless Quality of Service Manager (The WQM) by Agilent Technologies™, or by less automated alternative methods of constructing structured sequences of test cases.

The DMS 104 serves as the repository for the test sequence(s) configuration data (there typically exist more than one ordered test sequence 110, or "chain") and measurement results. Tests and their associated test modules 112 are stored at the ATC 108 and ATPs 106. The DMS 104 determines which test chain (identifying which "flows" or sequences and sub-sequences of tests) the active test controller (ATC) 108 is to execute upon the test probes 106, and conveys the test chain to the ATC during testing through an interface (such as an Internet network), which in turn downloads each flow in the chain to the ATPs 106. Control software on each ATP 106 executes the appropriate test modules, creating and managing an Error Stack for each flow in the chain.

Figure 3:
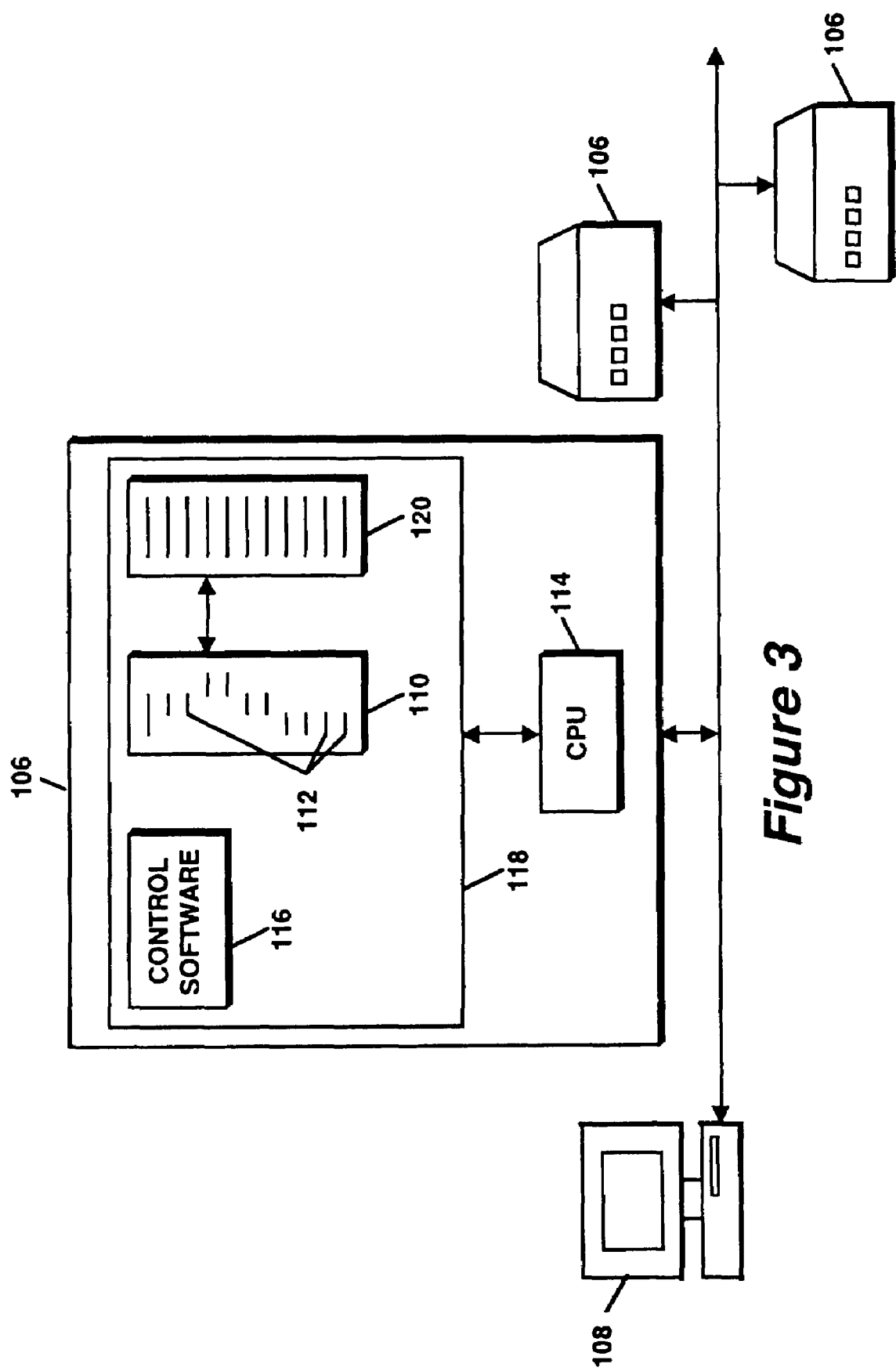
FIG. 3 is an illustration of the testing environment showing in greater detail the data structures and computer features of a test controller in said environment.

With reference to FIG. 3, the ATC 108 is preferably implemented as a computer, workstation, minicomputer, mainframe or any other system for executing software, and may be situated locally or remotely with respect to the ATPs 106. Each ATP 106 includes a central processing unit 114 for executing a control process software 116, that controls the test probes. Preferably, the control process software 116 is stored in a memory 118 associated with the computer. In a preferred embodiment, the source code of the control process software 116 is written in the Java programming language and executed on Linux or Windows/2000 operating systems (OS), but the present invention is by no means limited to such implementations. The control process software executes the ordered test module sequence 110 and additionally creates an Error Stack 120 for each flow in the chain, and pushes and pops information to/from the Error Stack related to the executing test modules, as will be described in more detail below. The test chain and Error Stack 120 are preferably implemented as instances of objects in an array, however, the most suitable data structure depends on the language being used. It should be noted that each of the test modules 112 as well as the control process software 116 comprise an ordered listing of executable instructions for implementing logical functions, and can be distributed via a communications link or embodied in any computer-readable medium for use, transport and local loading. In the context of the present invention, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It should be further noted that, although the ordered test sequence 110, Error Stack 120 and control software 116 are reflected as being resident upon the ATP, those of skill in the art will readily appreciate that other configurations are clearly possible.

Figure 2:
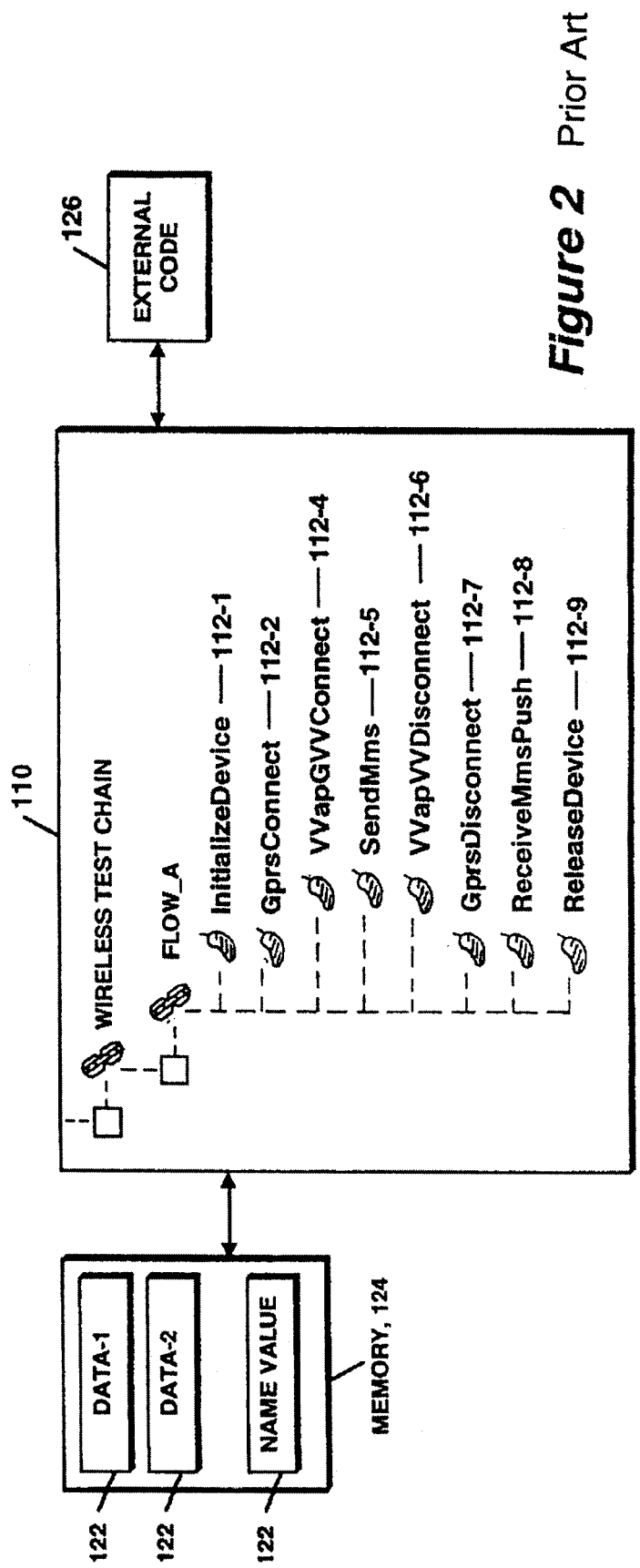
FIG. 2 is an illustration of an ordered test module sequence and possible data flow in a QoS testing system in which the present invention may be utilized.

As suggested by the test module names (e.g., InitializeDevice, GprsConnect, WapGWConnect, SendMms, etc.) reflected in the test sequence hierarchy depicted in FIG. 2, most (but not necessarily all) of the test modules 112 are reusable and perform operations related to various network components that alter the present "state" of the probe or service under test with respect to the client, such as, in the context of the described embodiment, tests that establish a connection, tests that can connect to web sites and "get" or "post" data, and tests that can send or receive messages. A wide variety of protocols may be utilized in the services testing system of the present invention, including but not limited to WAP, HTTP, e-mail, SMS, GPRS, MMS, etc.

FIG. 2 presents but one example of functional components and data exchange in the QoS testing system. The sequence of test modules 112, including InitializeDevice 112-1, GprsConnect 112-2, WapGWConnect 112-4, SendMms 112-5, WapGWDiscconnect 112-6, GprsDisconnect 112-7, ReceiveMmsPush 112-8, and ReleaseDevice 112-9 are executed by the control test software 116 of the present invention. Each of the test modules may have internal code or external code 126 that dynamically generates data 122 that may be captured by the ATPs 106. This data may be stored in and retrieved from a test session data memory 124 (preferably memory of the ATP) by that and subsequent test modules in the hierarchical test sequence, and may be dynamically changed by the operations of the test modules. The data can be analyzed to produce error messages, or may take the form of network service QoS metrics (e.g., performance data such as delay, reliability, and other parameters.) The acquired data may also be shared with and stored by the ATC 108 (or other ATPs.) The ATPs 106 may produce success/error information, including data such as indications of when errors occurred during testing, and acquired metrics in the form of regular expressions (name-value pairs, such as TimeMessageSent.value, MessagePassword.value, ConfirmationTime.value, etc.) or other suitable data format, which in turn may trigger appropriate actions by the control software 116, such as push/pops upon the Error Stack 120, transmission of messages to the DMS 104 and remote service monitors at the SOC or network monitors at the NOC 102, and/or local or remote alarm indicators.

Structured Teardown Algorithm

Figure 4:
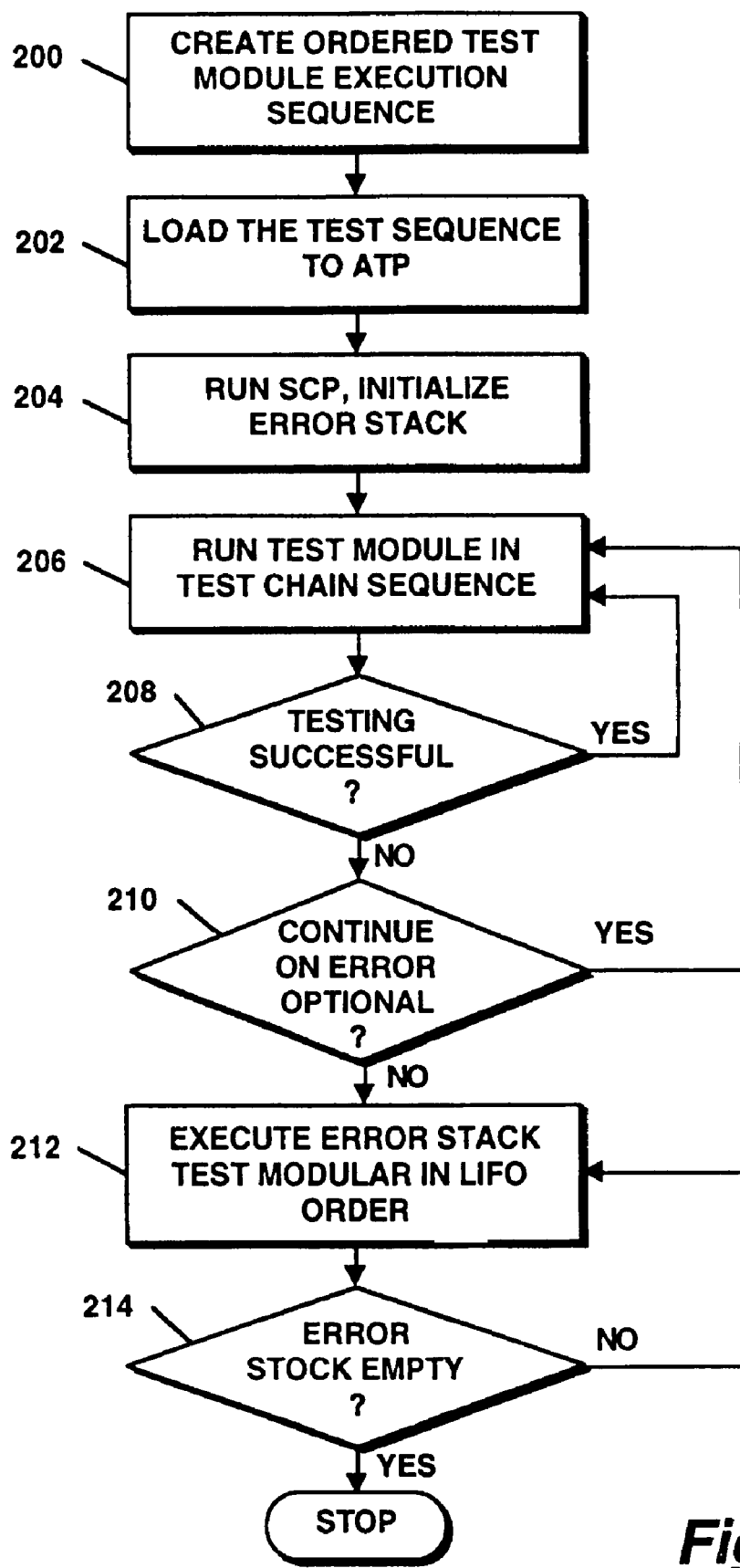
FIG. 4 is a flow diagram of a structured teardown method in accordance with the present invention.
Figures 5C, 5D:
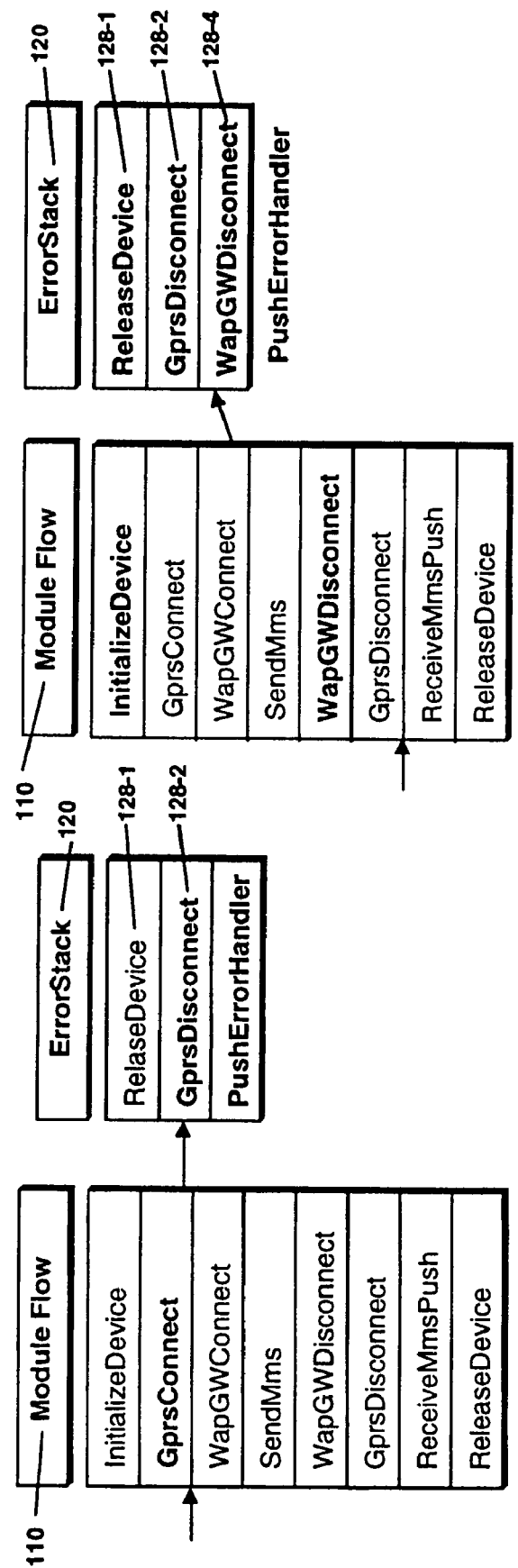
Figures 5E, 5F:
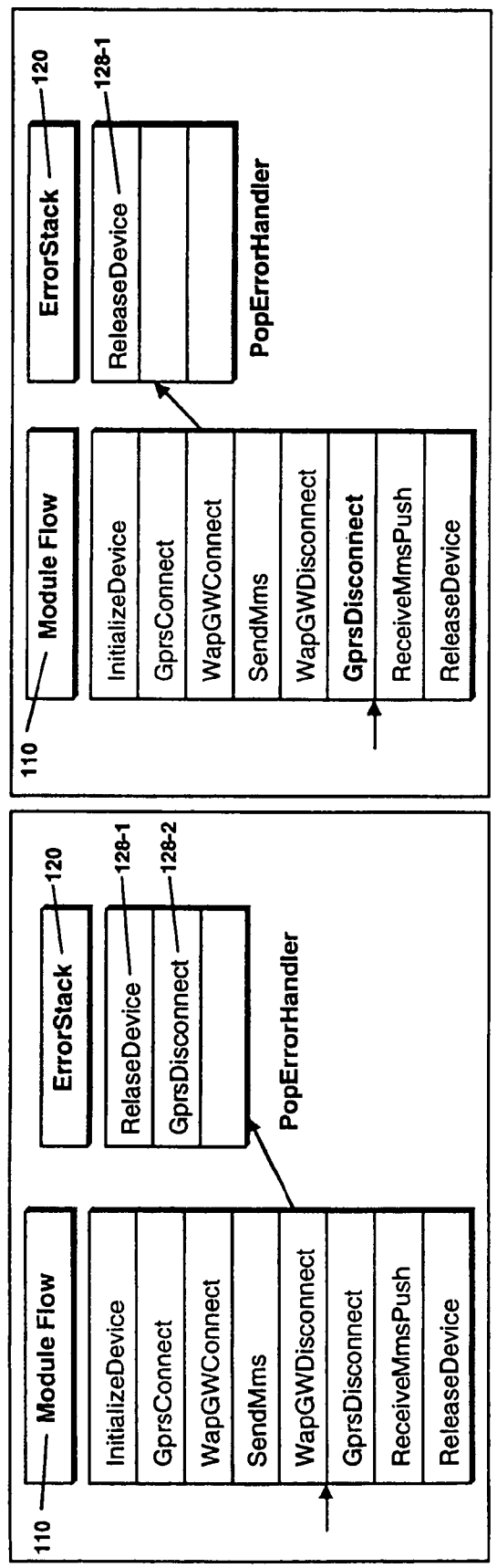
Figure 5G:
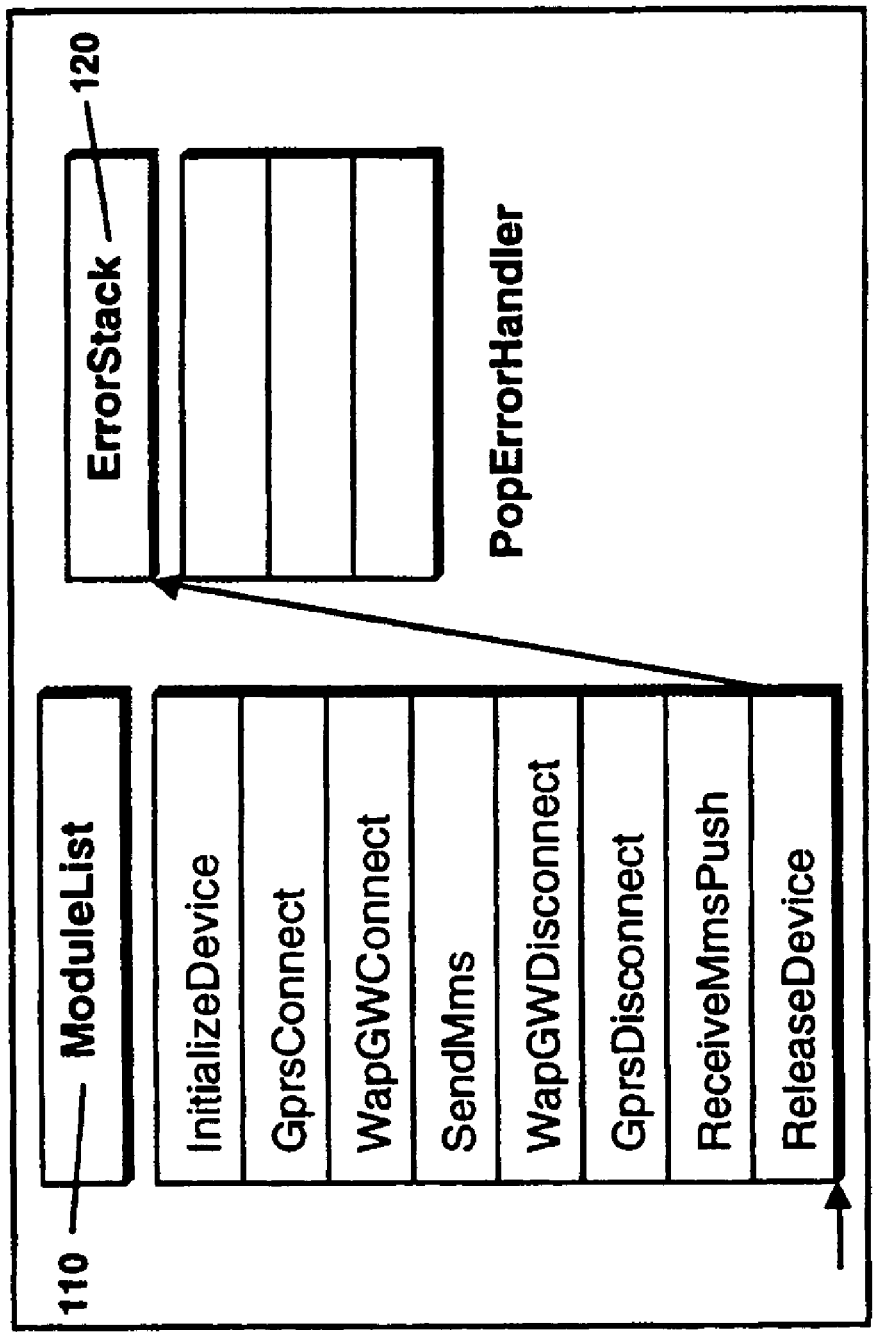

The operation of the control software 116 will now be described with reference to FIG. 4, which illustrates a method of reversible state build up and teardown in accordance with the present invention, and FIGS. 5A-5G that illustrate through an example the chain processing of the test modules 112 and effect on the Error Stack 120 of push/pull operations associated with the processing and system error handling.

In step 200, the test chain specifying ordered sequences (or flows) of test module names is created. As noted above, the test chain preferably comprises an object oriented list of names of test modules 112 that may be created by administrators or advanced service operators at the SOC or NOC 102 through interaction with graphics utilities of a diagnostic management system 104 such as the WQM system.

In step 202, the description of the test sequences is loaded by the ATC 108 to the ATP 106. As noted above, the loading is preferably by transmission from the DMS 104. The chain processes execution of the test modules with one or more flows, and executes each module sequentially within a flow.

In step 204, the ATP 106 starts execution of the control software 116 that initializes the Error Stack 120.

In step 206, the control software 116 runs the first (or next) test module 112 upon ATP 106 in the sequence specified in the test chain. In this embodiment, the ATC pushes onto the ATP(s) all the test properties required to run a test, such as, for example, the test description, name, login/network information and other information.

In step 208, a determination is made whether the just-executed test module resulted in a successful test. The chain checks a 'status' value returned by each test module. If the test was successful, i.e., if status.success='true', then processing returns to step 206 and the next test module in the test chain is run. The occurrence of a "triggering" error during execution of the test module will start the teardown process (step 212). In certain embodiments, the "triggering" error is any error occurring during the execution of the test module, but optionally some errors may specified that do not trigger the teardown. In such embodiments, as reflected by optional step 210, a further determination may be made whether the error encountered is an triggering error that should halt further attempts to access or interact with the service under test. Each test module contains a list of "acceptable" errors that may be encountered that should not halt further service tests and not trigger teardown. In the system implemented by the applicants, such errors are listed for each test module in a module-specific ContinueOnError module parameter. If such an non-triggering error encountered during execution of a test module, i.e., if status.success='false' and the encountered error matches one of the error listed by the ContinueOnError parameter, then processing returns to step 206 for execution of the next sequential test module. If an error occurs during testing, all test probe measurements made prior to the error is to be recorded. In any event, a description of the error that occurred will be passed from the probes to the ATC.

If the error encountered by the ATP 106 is a triggering error, i.e., one not matching one of the ContinueOnError listed errors allowing further sequential test module execution and build up of the state/connection, then in step 212 the ATP begins a structured teardown of the state/connection of the probe(s). In addition, the test sequence 110 reports (to the DMS) an unrecoverable error message. The structured teardown is performed by the ATP by executing the test modules identified in the Error Stack 120 in a last-in, first-out (LIFO) order. For example, if a connection has been setup with a WAP Gateway server, the test probe should properly tear down the connection before ending the test. Similarly, if a user has logged into a service and then encounters an error that should end the test, the user should be logged out before aborting. Such structured tear down allows the next test in a test suite to proceed unencumbered by errors encountered by the previous test. The chain controls the structured teardown, and may perform any required 'final clean-up' based on test results set to 'false' by executed test modules.

In step 214, the Error Stack is checked to determine whether additional test module identifiers remain in the Error Stack, and if additional identifiers remain, the next test module identifier is popped in LIFO order from the Error Stack and processing returns to step 212 to execute the identified test module.

The inventive connection/state teardown method facilitates more precise error identification to SOC or NOC monitors, reducing the number of extraneous and/or transient error signals received from tests subsequent to a failed test. The ATP in the present invention basically skips execution of the subsequent test modules that would otherwise send error messages following unsuccessful attempts to access or interact with the network service being diagnosed, and instead executes in LIFO order test modules identified in the Error Stack that teardown the built up state.

FIGS. 5A-5G illustrate an exemplary execution of the simple test chain 110 of FIG. 2 and the associated operations performed upon the Error Stack 120 during the sequence test module executions. This particular test plan would, if executed successfully without errors or only encountering ContinueOnError errors, instruct a remote (mobile cell) device to send a message back to the test probe 106 performing the test module sequence.

During the state/connection build up steps (206-210) of the method described above, as the modules are sequentially executed, prior to starting the execution of a module, the control software in the ATP 'pushes' an associated test module identifier 128 for the error handler of the module onto the Error Stack 120. Only state-creating/modifying modules specify error handlers. In the preferred implementation, each test module M capable of effecting a state or connection change includes an ErrorHandler parameter that identifies the corresponding test module that reverses the state or connection established by M. Whenever an ErrorHandler parameter is present (or non-empty) for a given module "m", the chain 110 pushes the identifier 128 of the test module (given by ErrorHandler) on the Error Stack 120 before the module M has completed executing (meaning the state/connection has been established.) FIGS. 5A-5D illustrate the pushing ErrorHandler test module names ReleaseDevice 128-1, GprsDisconnect 128-2, and WapGWDisconnect 128-4 onto Error Stack 120 upon successful completion of the corresponding InitializeDevice 112-1, GprsConnect 112-2 and WapGWConnect 112-4 test modules. Note that SendMms 112-5 is a simple message and not a state-changing test module, and thus does not push any error handler on to the stack.

If an error were encountered that did not match a ContinueOnError for that module (or any error in alternative embodiments), a structured teardown would be initiated (corresponding to steps 212-214 in the method described above.) As described above, this is accomplished by popping the names (test module identifiers 128) off the Error Stack 120 and execute them in a LIFO order. Whenever a module A finishes executing, the chain checks to see if A matches the name of the test module on top of the Error Stack 120. If there is a match, the chain pops A off the Error Stack 120. In this manner, the Error Stack is depopulated in a reverse order to keep it consistent with the state of the test flow.

Although the invention has been described with respect to various embodiments, it should be realized this invention is also capable of a wide variety of further and other embodiments within the spirit and scope of the appended claims.

We claim:

1. Method of error-tolerant modular testing of services, comprising the steps of:

sequentially populating an error stack with a test module identifier associated with one of a sequence of executed state-changing test modules operating upon a device interacting with a service;

upon the occurrence during execution of the sequence of state-changing test modules of a triggering error, running in a reverse order the test modules identified in the error stack so as to cause a structured teardown of the test sequence; and repeating the previous steps until the sequential execution of test modules is complete or a triggering error is encountered.

2. The method of claim 1, wherein:

each of the test modules contains an indication of acceptable errors; and the triggering error comprises an error not among the acceptable errors.

3. The method of claim 1, wherein the device is an active network probe in communications with a network, the service is a network service, and the sequence of state-changing tests operate to test the QoS of the network service.

4. The method claim 1, further comprising the step of creating the error stack.

5. The method of claim 1, further comprising the step of executing one or more non-state-changing tests interspersed among the sequence of executed state-changing tests without alteration of the error stack.

6. The method of claim 1, further comprising the step of acquiring data relevant to the execution of each test module.

7. The method of claim 6, further comprising the step of recording the acquired data prior to the occurrence of the triggering error.

8. The method of claim 7, wherein the data comprises a pass/fail message indicating the success/failure of that test, indications of when during the test sequence an error occurred, and/or metrics related to the performance of the service.

9. The method of claim 1, wherein the sequentially populating step further comprises pushing the test identification information of each test onto the error stack prior to starting that test.

10. The method of claim 1, wherein the running in reverse order step further comprises popping the test module identifier of each successfully executed test module from the error stack.

11. A computer-readable medium storing a program which when executed by a computer causes the computer to execute the functions comprising:

sequentially populating an error stack witt a test module identifier associated with one of a sequence of executed state-changing test modules operating upon a device interacting with a service;

upon the occurrence during execution of the sequence of state-changing test modules of a triggering error, running in a reverse order the test modules identified in the error stack so as to cause a structured teardown of the test sequence; and repeating the previous steps until the sequential execution of test modules is complete or a triggering error is encountered.

12. The medium of claim 11, wherein:

each of the test modules contains an indication of acceptable errors; and the triggering error comprises an error not among the acceptable errors.

13. The medium of claim 11, wherein the device is an active network probe in communications with a network, the service is a network service, and the sequence of statechanging tests operate to test the QoS of the network service.

14. The medium of claim 11, further comprising the step of creating the error stack.

15. The medium of claim 11, wherein the functions further comprise executing one or more non-state-changing tests interspersed among the sequence of executed state-changing tests without altering the error stack.

16. The medium of claim 11, wherein the functions further comprise acquiring data relevant to the execution of each test module.

17. The medium of claim 16, wherein the data comprises a pass/fail message indicating the success/failure of that test, indications of when during the test sequence an error occurred, and/or metrics related to the performance of the service.

18. The medium of claim 16, wherein the functions further comprise recording the acquired data prior to the occurrence of the triggering error.

19. The medium of claim 11, wherein the sequentially populating function further comprises pushing the test identification information of each test onto the error stack before starting that test.

20. The medium of claim 11, wherein the running in reverse order function further comprises popping the test module identifier of each successfully executed test module from the error stack.

* * * * *

UNITED STATES PATENT AND TRADEMARK OFFICE
CERTIFICATE OF CORRECTION

PATENT NO. : 7,246,276 B2
APPLICATION NO. : 10/958049
DATED : July 17, 2007
INVENTOR(S) : Bartz et al.

It is certified that error appears in the above-identified patent and that said Letters Patent is hereby corrected as shown below:

In column 8, line 46, in Claim 11, delete "witt" and insert -- with --, therefor.

In column 8, lines 66-67, in Claim 13, delete "statechanging" and insert -- state-changing --, therefor.

Signed and Sealed this

Twenty-seventh Day of November, 2007

JON W. DUDAS
*Director of the United States Patent and Trademark Office*